United States Patent
Khalsa et al.

(10) Patent No.: US 9,433,067 B2
(45) Date of Patent: *Aug. 30, 2016

(54) DIMMING A MULTI-LAMP FLUORESCENT LIGHT FIXTURE BY TURNING OFF AN INDIVIDUAL LAMP USING A WIRELESS FLUORESCENT LAMP STARTER

(75) Inventors: Kamlapati Khalsa, San Jose, CA (US); Yefim Gluzman, San Francisco, CA (US); Quyen Tran, Morgan Hill, CA (US); David D. Eaton, San Jose, CA (US)

(73) Assignee: IXYS Intl Limited (KY)

( * ) Notice: Subject to any disclaimer, the term of this patent is extended or adjusted under 35 U.S.C. 154(b) by 1768 days.

This patent is subject to a terminal disclaimer.

(21) Appl. No.: 12/587,169

(22) Filed: Oct. 3, 2009

(65) Prior Publication Data
US 2011/0080107 A1 Apr. 7, 2011

(51) Int. Cl.
H05B 41/04 (2006.01)
H05B 41/392 (2006.01)
H05B 37/02 (2006.01)

(52) U.S. Cl.
CPC ........ *H05B 41/046* (2013.01); *H05B 37/0227* (2013.01); *H05B 37/0272* (2013.01); *H05B 41/392* (2013.01)

(58) Field of Classification Search
CPC .. H05B 41/046; H05B 41/392; H05B 41/38; H05B 41/04; H05B 39/041; H05B 39/086; H05B 39/088; H05B 37/038; H05B 37/0272; H05B 37/0227; H05B 37/02
USPC .... 315/250, 294, 320, 313, 291, 224, 209 R
See application file for complete search history.

(56) References Cited

U.S. PATENT DOCUMENTS 4,145,638 A * 3/1979 Kaneda ......................... 315/323
4,513,225 A * 4/1985 Lemmers et al. ............ 315/189

(Continued)

FOREIGN PATENT DOCUMENTS

| EP | 2306776 | 9/2009 |
| EP | 2306777 | 9/2009 |

(Continued)

OTHER PUBLICATIONS

Extended European Search Report (Office action) by EPO in related European application EP10185267.1 dated Jan. 1, 2014 (9 pages).

*Primary Examiner* — Jimmy Vu
*Assistant Examiner* — Henry Luong
(74) *Attorney, Agent, or Firm* — Imperium Patent Works; Joseph S. Spano; Darien K. Wallace

(57) ABSTRACT

A multi-lamp fluorescent light fixture includes a plurality of replaceable fluorescent lamp starter units. Each starter unit has a built-in microcontroller, an RF (Radio-Frequency) receiver, and communicates wirelessly with a master unit. The plurality of starter units can be wirelessly controlled to dim the multi-lamp fixture. Each starter unit receives a DIM command. Each starter unit identified as a dimmer starter unit responds to the DIM command by turning off coupled fluorescent lamps. Starter units not identified as dimmer starter units respond by leaving coupled lamps turned on, or alternatively, turning off and quickly restarting coupled lamps. Systems of existing light fixtures are retrofitted with such wireless starter units, and thereby made controllable by a master unit so that the master unit can dim the lights if room occupancy is not detected or if sufficient ambient light is available.

20 Claims, 12 Drawing Sheets

DIM MULTI-LAMP LIGHT FIXTURE BY TURNING OFF LAMPS AND RESTARTING A SUBSET OF LAMPS

(56) References Cited

U.S. PATENT DOCUMENTS

| | | | |
|---|---|---|---|
| 5,811,940 A | 9/1998 | Nutzel | 315/291 |
| 6,859,644 B2* | 2/2005 | Wang | 455/159.2 |
| 8,184,674 B2 | 5/2012 | Pope | 375/138 |
| 8,653,935 B2 | 2/2014 | Baker | 340/3.2 |
| 2004/0046511 A1* | 3/2004 | Porter | 315/291 |
| 2007/0183133 A1 | 8/2007 | Buij et al. | 362/85 |
| 2008/0111498 A1* | 5/2008 | Budike | H05B 37/0272 315/291 |
| 2009/0014625 A1* | 1/2009 | Bartol et al. | 250/205 |
| 2009/0243517 A1* | 10/2009 | Verfuerth et al. | 315/315 |
| 2009/0248217 A1* | 10/2009 | Verfuerth et al. | 700/295 |
| 2009/0315485 A1* | 12/2009 | Verfuerth et al. | 315/320 |
| 2011/0080091 A1 | 4/2011 | Staab et al. | 315/61 |
| 2011/0080106 A1 | 4/2011 | Khalsa et al. | 315/250 |

FOREIGN PATENT DOCUMENTS

| | | |
|---|---|---|
| EP | 2309827 | 10/2009 |
| EP | 2312914 | 10/2009 |
| WO | WO 01/35181 | 11/1999 |
| WO | WO 2005/101919 | 4/2004 |
| WO | WO 2009/066223 | 11/2007 |

* cited by examiner

RF-ENABLED STARTER UNITS DIM MULTI-LAMP LIGHT FIXTURE

DIM MULTI-LAMP LIGHT FIXTURE BY TURNING OFF LAMPS AND
RESTARTING A SUBSET OF LAMPS

ELECTRICAL CHARACTERISTICS INDICATING DIMMER STATUS

SOFTWARE INDICATOR STORED IN MEMORY INDICATING DIMMER STATUS

HARDWARE PIN CONFIGURATION INDICATING DIMMER STATUS

R/F COMMUNICATION FROM MASTER
UNIT INDICATING DIMMER STATUS

LAMP TURNED ON

STARTER RECEIVES TURN OFF
COMMAND AND MONITORS VRECT

INITIATE TURN OFF WHEN VRECT REACHES VTHRS1

OPEN SWITCH

OPERATE SWITCH AS A VOLTAGE CLAMP

TURN OFF COMPLETE

INITIAL TURNED OFF CONDITION

PREHEATING

HIGH VOLTAGE

IGNITION AND USAGE

DIMMING A MULTI-LAMP FLUORESCENT LIGHT FIXTURE BY TURNING OFF AN INDIVIDUAL LAMP USING A WIRELESS FLUORESCENT LAMP STARTER

TECHNICAL FIELD

The described embodiments relate to starter units for fluorescent lamps.

BACKGROUND INFORMATION

A multi-lamp fluorescent light fixture involves a number of tubular fluorescent bulbs. Each fluorescent bulb is also referred to here as a fluorescent lamp. Each tube is a glass tube that contains an ionizable gas and a small portion of mercury. There are filaments at each end of the tube. By application of proper electrical voltages, the filaments can be made to heat up and to ionize the ionizable gas in the tube. After sufficient heating, if a voltage of adequate magnitude is subsequently provided between the filaments, an electrical arc can be initiated through the ionized gas in the tube between the filaments. The arc involves a flow of current from one filament, through the ionized gas, to the other filament. Energetic electrons in this current flow collide with the mercury atoms, thereby exciting the mercury atoms and causing them to emit ultraviolet radiation. The emitted ultraviolet radiation is absorbed by and excites a phosphor coating on the inside of the walls of the tube. The phosphor coating fluoresces and emits radiation in the visible spectrum (i.e., visible light). The visible light passes outward through the glass and is usable for illuminating purposes.

Some such multi-lamp fluorescent light fixtures involve a plurality of starter circuits, each commonly referred to as a "starter." In a first step, a switch in the starter closes and forms an electrical connection between the filament at one end of a tube and the filament at the other end of the tube such that an AC current can flow from an AC power source, through an ballast, through one filament, through the closed switch of the starter, and through the second filament, and back to the AC power source. This AC current flow causes the filaments to heat. The heating of the filaments causes gas surrounding the filaments to ionize. Once the gas is ionized in this way, then the switch in the starter is opened. The opening of the switch cuts current flow through the ballast, thereby causing a large voltage spike to develop across the ballast. Due to the circuit topology, this large voltage is present between the two filaments. The voltage is large enough to strike an arc through the gas. Once the arc is established, the resistance between the two filaments through the gas decreases. This allows the current to continue to flow through the gas without a large voltage being present between the filaments. The switch is left open, the current continues to flow, filaments continue to be heated, the arc is maintained, and the current flow is regulated by the ballast. The fluorescent lamp is then on and emits visible light to illuminate an area.

In multi-lamp fluorescent light fixtures, the starters may fail. Each starter is therefore sometimes made to be a replaceable unit. Great numbers of fluorescent light fixtures with replaceable starter units are installed throughout the world. Large numbers of such fluorescent light fixtures are installed in public buildings, office buildings, and other large buildings. Quite often the fluorescent lights are left on and consume electrical energy even though the area served does not need to be illuminated. A way of preventing this waste of electrical energy is desired.

Infrared motion detecting wall switches are often employed to prevent the waste of energy due to lights being left on when lighting is not needed. If an infrared motion detector in the wall switch does not detect motion of an infrared emitter (for example, a human body) in the vicinity of the wall switch, then circuitry in the wall switch determines that the room is not occupied by a person. Presumably if a person were in the room, the person would be moving to some extent and would be detected as a moving infrared emitter. If the wall switch determines that the room is unoccupied because it does not detect any such moving infrared emitter, then the wall switch turns off the fluorescent lights on the circuit controlled by the wall switch. The wall switch turns off the fluorescent lights by cutting AC power flowing to the fluorescent lamp light fixtures through power lines hardwired into the building. If, however, the wall switch detects a moving infrared emitter, then the wall switch turns on the lights by energizing the hardwired power lines so that AC power is supplied to the fluorescent light fixtures through the hardwired power lines.

The wall switch motion detection system involving hardwired power lines embedded in the walls and ceilings of buildings is quite popular, but a wireless system has been proposed whereby each of the replaceable starter units is to be provided with an RF receiver. Each starter unit is able to selectively turn off a fluorescent lamp within a multi-lamp fluorescent light fixture to dim the light output of the fixture in response to RF commands received from a master control unit.

SUMMARY

A multi-lamp fluorescent light fixture includes a plurality of replaceable fluorescent lamp starter units. Each starter unit has a built-in microcontroller, an RF (Radio-Frequency) receiver, and communicates wirelessly with a master unit. Each starter unit can be wirelessly controlled to dim the multi-lamp fixture. Each starter unit receives a DIM command. Each starter unit identified as a dimmer starter unit responds to the DIM command by turning off coupled fluorescent lamps. In one example; starter units not identified as dimmer starter units respond by leaving coupled lamps turned on. In another example, starter units not identified as dimmer starter units respond by turning off and quickly restarting coupled lamps.

In one aspect, a starter unit of a multi-lamp light fixture identifies itself as a dimmer starter unit by monitoring the Alternating Current (AC) voltage supplied to coupled fluorescent lamps, identifying an electrical characteristic of the AC voltage, and identifying itself as a dimmer starter unit based on the electrical characteristic. In one example, the peaks of the AC voltage vary over time between a minimum peak voltage signal, VMIN, and a maximum peak voltage signal, VMAX. The voltage difference value, VDIFF, between VMAX and VMIN is used to indicate whether a starter unit should identify itself as a dimmer starter unit.

In another aspect, a starter unit of a multi-lamp light fixture identifies itself as a dimmer starter unit by reading dimmer configuration information stored in on-board memory. In one example, dimmer configuration information is programmed into memory as part of the manufacturing or installation process. In another example, dimmer configuration information is wirelessly communicated from a master unit to the starter unit and the starter unit stores this information in on-board memory.

In another aspect, a starter unit of a multi-lamp light fixture identifies itself as a dimmer starter unit based on a hardware indicator. In one example, a pin is configured on-board the starter unit and the pin configuration indicates whether the starter unit is designated as a dimmer starter unit.

Systems of existing light fixtures are retrofitted with such wireless starter units without requiring a person to touch the AC power mains, and thereby are made controllable by a master unit so that the master unit can dim the lights if room occupancy is not detected or if sufficient ambient light is available. The master unit can be installed in a location to detect whether an area illuminated by the fluorescent light fixture is occupied by a person or is sufficiently illuminated by ambient light. The master unit may, for example, be a battery-powered unit that is fixed to the ceiling of a room.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
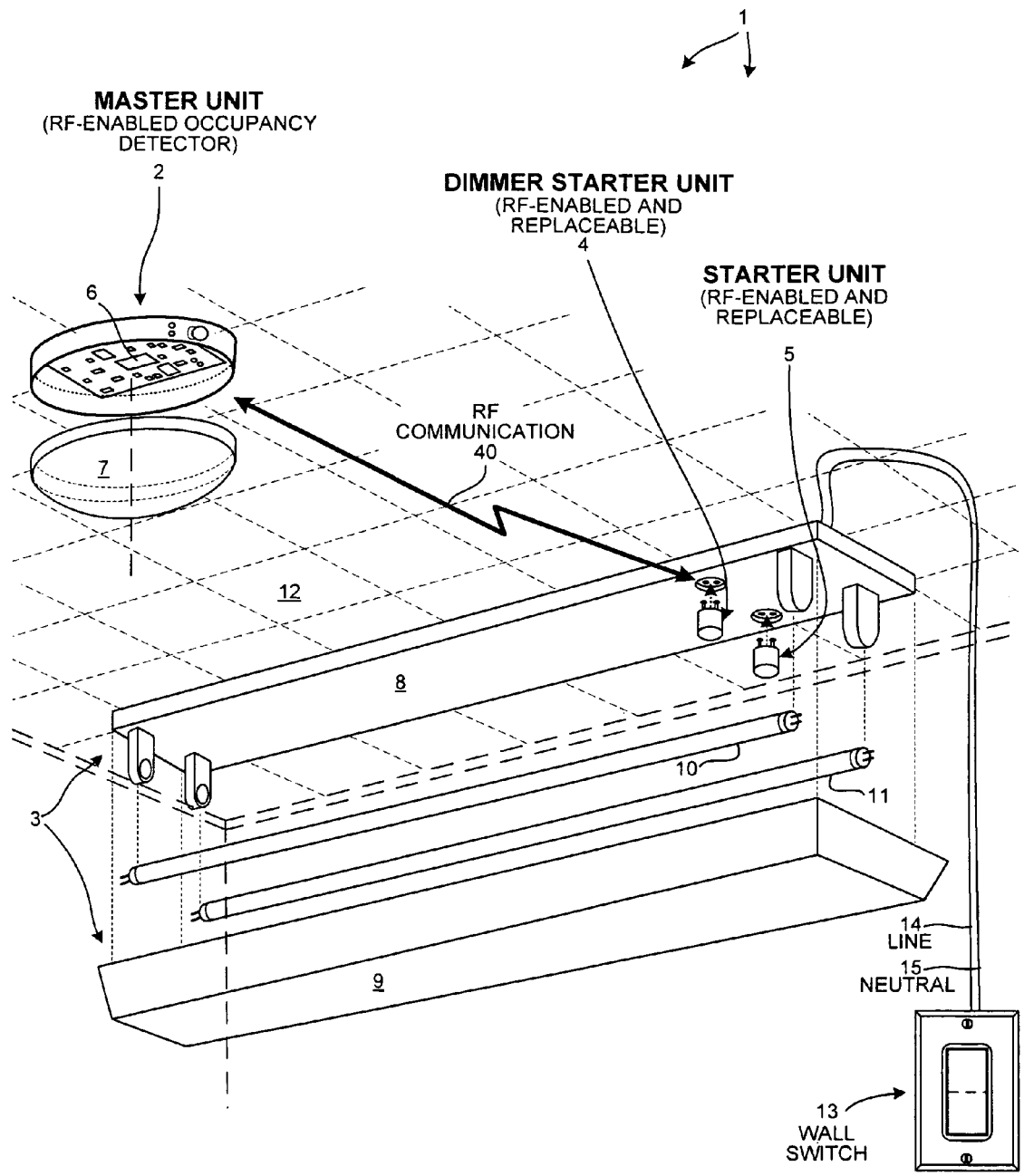
FIG. 1 is a simplified perspective diagram of a system involving a master unit and a fluorescent light fixture involving replaceable RF-enabled starter units.

FIG. 1 is a diagram of a system 1. System 1 involves a master unit 2 and a plurality of multi-lamp fluorescent light fixtures having fluorescent lamp starter units. For illustrative purposes, one multi-lamp fluorescent light fixture 3 is pictured in FIG. 1. Other multi-lamp fluorescent light fixtures of system 1 are not pictured. Multi-lamp fluorescent light fixture 3 includes two fluorescent lamps 10 and 11 and starter units 4 and 5 associated with each lamp, respectively. In this example, master unit 2 is an infrared occupancy detector involving a Passive InfraRed (PIR) sensor 6 and a multi-section fresnel lens 7. Using techniques well known in the art, master unit 2 detects motion of infrared emitters in the field of view of the fresnel lens and detects the lack of motion of such infrared emitters. If the master unit detects motion, then the master unit is to turn on or to keep on the fluorescent lamps of the fluorescent light fixtures of system 1. If, on the other hand, the master unit does not detect motion, then the master unit is to dim the multi-lamp fixture 3 of system 1 to conserve electrical energy. In another example, master unit 2 includes an ambient light detector useable to indicate available ambient light. Based on the available ambient light, the master unit may dim the multi-lamp fixture 3 of system 1 to conserve electrical energy.

In the illustration of FIG. 1, multi-lamp light fixture 3 includes a base portion 8, a translucent cover portion 9, fluorescent bulbs or lamps 10 and 11, and their associated starter units 4 and 5, respectively. Ballasting inductances (not shown) are part of the base portion 8. Both the multi-lamp light fixture 3 and the master unit 2 are fixed to the ceiling 12 of a room in a building as shown. A wall switch 13 is connected by electrical wires 14 and 15 to all the light fixtures of system 1 in standard fashion so that a person in the room can manipulate the wall switch to turn on, and to turn off, the fluorescent lights. The electrical wires 14 and 15 are embedded in the walls and ceiling of the building. In the illustrated example, wire 14 is the LINE wire, whereas wire 15 is the NEUTRAL wire.

Master unit 2 has a Radio-Frequency (RF) transceiver (transmitter and receiver) for engaging in RF communication, including RF communication 40 with the starter units of system 1. As pictured, master unit 2 need not be connected to any hardwired electrical wiring in the building. The master unit 2 pictured is a self-contained, battery-powered, unit that is fixed to the ceiling 12 of the room illuminated by system 1. Master unit 2 can be easily fixed to ceiling 12 by application of adhesive tape or by a screw or other common attachment mechanism. Each multi-lamp light fixture of system 1 includes a plurality of replaceable starter units. Starter units 4 and 5 pictured in FIG. 1 is one example. In this example, starter unit 4 is identified as a dimmer starter unit, and starter unit 5 is not identified as a dimmer starter unit. Dimmer starter units are distinguished by their response to a DIM command communicated via RF communication 40 from master unit 2.

Figure 2:
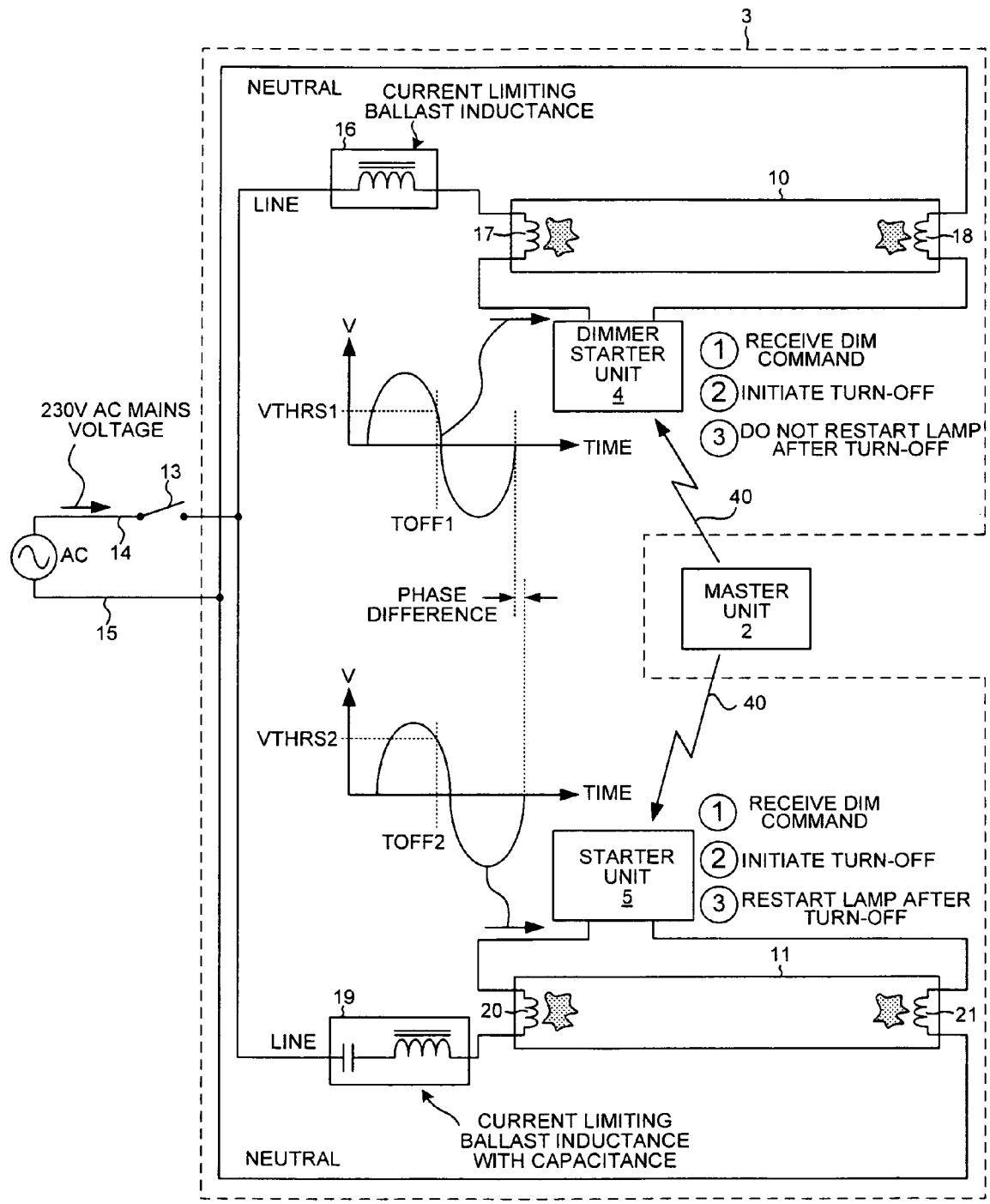
FIG. 2 is illustrative of one embodiment operable to dim a multi-lamp fluorescent light fixture by turning off all lamps and restarting a subset of lamps.

FIG. 2 is a more detailed view of system 1 illustrative of one example of dimming multi-lamp fixture 3. In this example, 230 Volts Alternating Current (AC) Mains voltage is the AC line voltage supplied to multi-lamp fluorescent light fixture 3. The AC line voltage is supplied over LINE conductor 14 through wall switch 13. A neutral voltage return path is provided by NEUTRAL conductor 15. Multi-lamp light fixture 3 can be electrically disconnected from the AC MAINS voltage supply by manipulation of wall switch 13. Within multi-lamp light fixture 3, the AC line voltage is supplied to ballasts 16 and 19. Ballast 16 supplies current to fluorescent lamp 10 when lamp 10 is turned on. While turned on, current flows from ballast 16, through filament 17, over an electrical arc within lamp 10 to filament 18, and back to the AC MAINS voltage supply via NEUTRAL conductor 15. Similarly, ballast 19 supplies current to fluorescent lamp 11 when lamp 11 is turned on. While turned on, current flows from ballast 19, through filament 20, over an electrical arc within lamp 11 to filament 21, and back to the AC MAINS voltage supply via NEUTRAL conductor 15.

In one example, dimmer starter unit 4 receives a DIM command from master unit 2 via RF communication 40. In response, dimmer starter unit 4 begins to monitor the AC voltage being supplied to fluorescent lamp 10. When the AC voltage reaches voltage threshold level VTHRS1, dimmer starter unit 4 initiates turn off of lamp 10 at a time TOFF1. In another example, when dimmer starter unit 4 receives a DIM command from master unit 2, dimmer starter unit 4 immediately initiates turn off of lamp 10. After turn off of lamp 10 is complete, dimmer starter unit 4 does not restart lamp 10 in response to the DIM command.

In the illustrated example, starter unit 5 receives the DIM command from master unit 2 via RF communication 40. In response, starter unit 5 begins to monitor the AC voltage being supplied to fluorescent lamp 11. When the AC voltage reaches voltage threshold level VTHRS2, starter unit 5 initiates turn off of lamp 11 at a time TOFF2. In another example, when starter unit 5 receives a DIM command from master unit 2, starter unit 5 immediately initiates turn off of lamp 11. After turn off of lamp 11 is complete, starter unit 5 waits for a period of time, and subsequently restarts lamp 11 in response to the DIM command. In yet another example starter unit 5 waits less than three seconds after turn off of lamp 11 before restarting lamp 11. Thus, after turn off of lamp 11 is complete, starter unit 5 restarts lamp 11 in response to the DIM command.

In another example, dimmer starter unit 4 turns off lamp 10 in response to receiving the DIM command, while starter unit 5 receives, but does not respond to the DIM command, leaving lamp 11 illuminated. In yet another example, dimmer starter unit 4 turns off lamp 10 in response to receiving the DIM command, while starter unit 5 does not receive the DIM command and does not respond to the DIM command, leaving lamp 11 illuminated As illustrated in FIG. 2, VTHRS1 and VTHRS2 are selected such that dimmer starter unit 4 initiates turn off of lamp 10 at substantially the same time as starter unit 5 initiates turn off of lamp 11. VTHRS1 and VTHRS2 may be selected to have different values or may be selected to have the same value. It is desirable to turn-off lamp 10 and lamp 11 at substantially the same time to reduce the probability that one lamp will restart the other due to electro-magnetic coupling effects. Ballast 16 has an inductive component that performs a current limiting function to stabilize current flow through lamp 10. Similarly, ballast 19 also has an inductive component to stabilize current flow through lamp 11. In addition, however, ballast 19 also includes a capacitive component for purposes of power factor correction. For example, ballast 19 may exhibit a capacitance of five microfarads. The difference in reactance between ballasts 16 and 19 causes an overall phase shift between the AC voltage supplied to fluorescent lamp 10 and the AC voltage supplied to fluorescent lamp 11. Based on this phase shift, VTHRS1 and VTHRS2 are selected such that starter unit 4 initiates turn-off of lamp 10 at substantially the same time as starter unit 5 initiates turn-off of lamp 11. In one example, VTHRS1 and VTHRS2 are individually selected such that starter 4 initiates turn-off of lamp 10 within 1 millisecond of when starter unit 5 initiates turn-off of starter unit 5. Thus the difference between TOFF1 and TOFF2 is less than one millisecond. In another example, VTHRS1 and VTHRS2 are selected to have the same value such that starter 4 initiates turn-off of lamp 10 within 1 millisecond of when starter unit 5 initiates turn-off of starter unit 5. Thus the difference between TOFF1 and TOFF2 is less than one millisecond.

Figure 3:
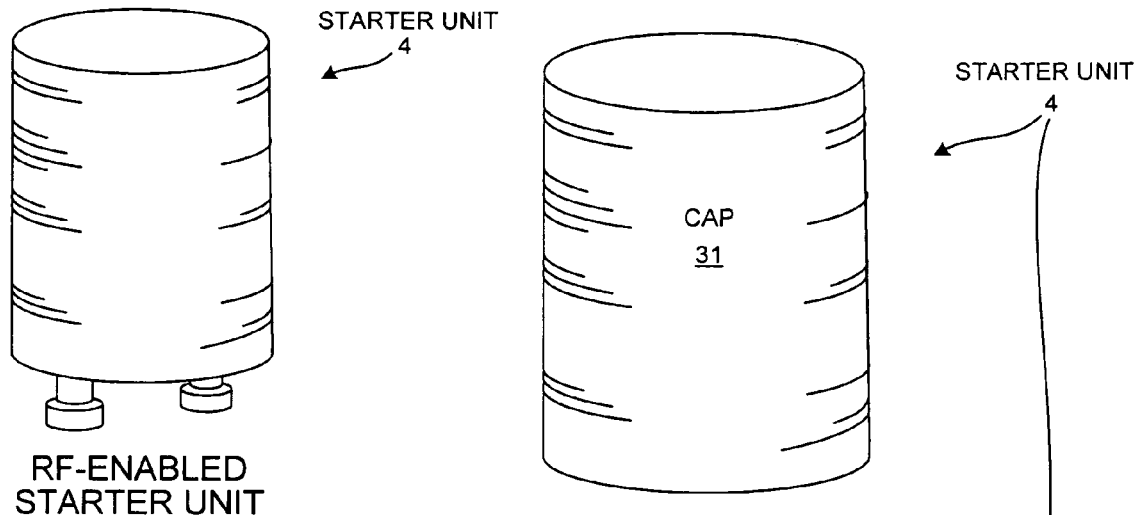
FIG. 3 is a perspective view of a starter unit of FIG. 1.

FIG. 3 is a perspective view of dimmer starter unit 4 and is typical of starter unit 5.

Figure 4:
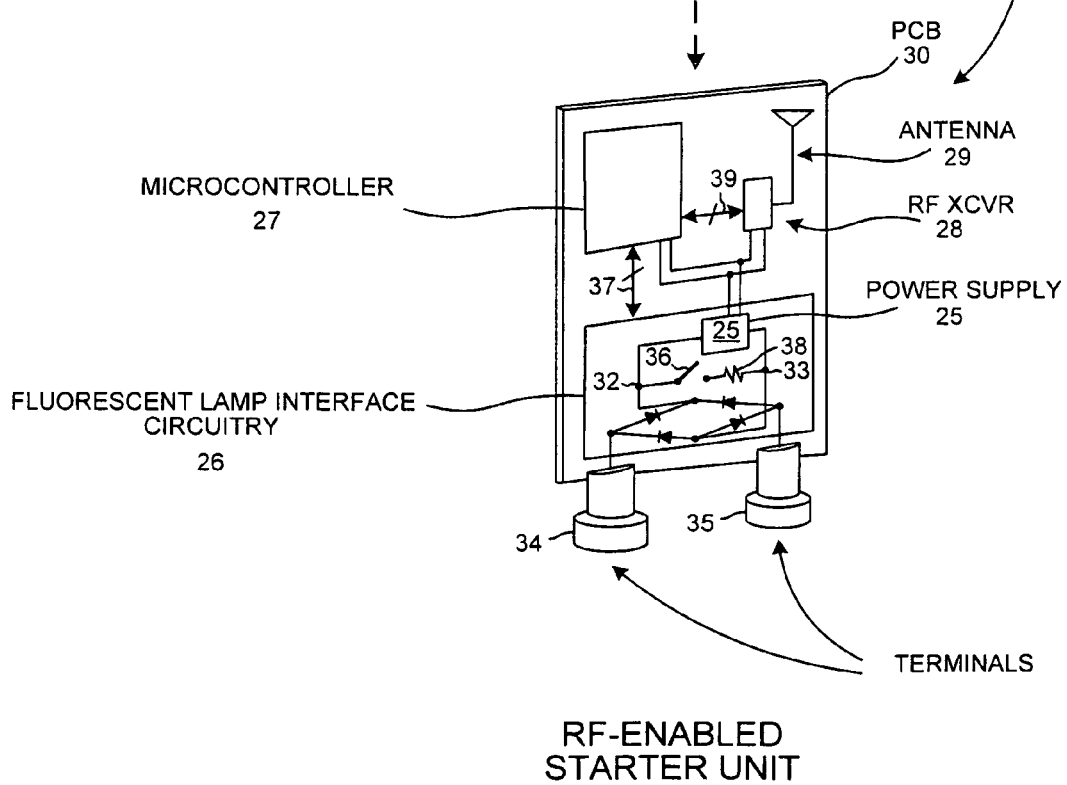
FIG. 4 is an exploded perspective view of an RF-enabled starter unit of FIG. 3.

FIG. 4 is an exploded perspective view of dimmer starter unit 4 and is typical of starter unit 5. Dimmer starter unit 4 includes a first terminal 34, a second terminal 35, a power supply 25, fluorescent lamp interface circuitry 26, a microcontroller integrated circuit 27, an RF transceiver 28, and an antenna 29. This circuitry is disposed on a printed circuit board (PCB) 30 as illustrated. PCB 30 is disposed within a cylindrical cap 31. Terminals 34 and 35 extend downward through holes in a circular disk-shaped base portion (not shown) of PCB material. The circular edge of this disk-shaped base portion joins with the circular bottom edge of cap 31 and forms a circular bottom of dimmer starter unit 4.

Fluorescent lamp interface circuitry 26 includes a full wave rectifier that receives an AC voltage signal between terminals 34 and 35 and outputs full wave rectified signal between nodes 32 and 33. Power switch 36 is a switch that is used to turn on, and to turn off, fluorescent lamp 10. Power switch 36 is a power Field Effect Transistor (FET) that is controlled by microcontroller 27 via gate drive circuitry of circuitry 26. Microcontroller 27 drives the gate of switch 36 and controls and monitors the remainder of interface circuitry 26 via signals communicated across conductors 37. When switch 36 is open, microcontroller 27 monitors and traces the AC voltage waveform between nodes 32 and 33 using an Analog-to-Digital Converter (ADC) that is part of the microcontroller. When switch 36 is closed, microcontroller 27 monitors and traces a voltage drop across a sense resistor 38. Thus, the resulting waveform between nodes 32 and 33 is indicative of the current flowing through switch 36 of starter unit 4. In one example, sense resistor 38 has a resistance value of approximately 0.1 ohms. Microcontroller 27 uses an on-board comparator and timer to detect and time zero-crossings of the AC signal on terminals 34 and 35. Microcontroller 27 determines when and how to control switch 36 based on the detected AC voltage between nodes 32 and 33, the time of the zero-crossings of the AC signal on terminals 34 and 35, and the magnitude of current flow through switch 36. In one example, during power up microcontroller 27 reads a known location in FLASH memory for voltage threshold information, including the magnitudes of VTHRS1 and VTHRS2. This voltage threshold information may be used by microcontroller 27 to initiate turn off of an associated fluorescent lamp in response to a DIM command. In another example, during power up microcontroller 27 reads a known location in FLASH memory for dimmer configuration information. This dimmer configuration information is used by microcontroller 27 to identify starter unit 4 as a dimmer starter unit.

Power supply 25 receives the full wave rectified signal between nodes 32 and 33 and generates therefrom a direct current (DC) supply voltage VDD used to power microcontroller 27, RF transceiver 28, and interface circuitry 26. Power supply 25 includes a capacitance that is charged to the DC supply voltage VDD. This capacitance is large enough that it continues to power the microcontroller and RF transceiver of the starter unit for more than five seconds after 230 VAC power is removed from terminals 34 and 35.

Microcontroller 27 communicates with and controls RF transceiver 28 via a bidirectional serial SPI bus and serial bus conductors 39. In one embodiment, microcontroller 27 is a Z8F2480 8-bit microcontroller integrated circuit available from Zilog, Inc., of Milpitas, Calif. Microcontroller 27 includes an amount of non-volatile memory (FLASH memory) that can be written to and read from under software control during operation of dimmer starter unit 4. In one embodiment, RF transceiver 28 is a SX1211 transceiver integrated circuit available from Semtech Corporation, 200

Flynn Road, Camarillo, Calif. 93012. Transceiver 28 is coupled to antenna 29 via an impedance matching network (not shown) and a SAW filter (not shown). The SAW filter may, for example, be a B3716 SAW filter available from the Surface Acoustic Wave Components Division of EPCOS AG, P.O. Box 801709, 81617 Munich, Germany. Antenna 29 may, for example, be a fifty ohm 0868AT43A0020 antenna available from Johanson Technology, Inc., 4001 Calle Tecate, Camarillo, Calif. 93012. The RF transceiver operates in a license free frequency band in the 863-878 MHz range (for example, about 868 MHz), in accordance with a reference design available from Semtech Corporation. The RF antenna and transceiver of dimmer starter unit 4 can receive an RF communication 40 (see FIG. 1) from master unit 2. The data payload of the communication 40 is communicated across SPI bus conductors 39 to microcontroller 27 for processing.

Figure 5:
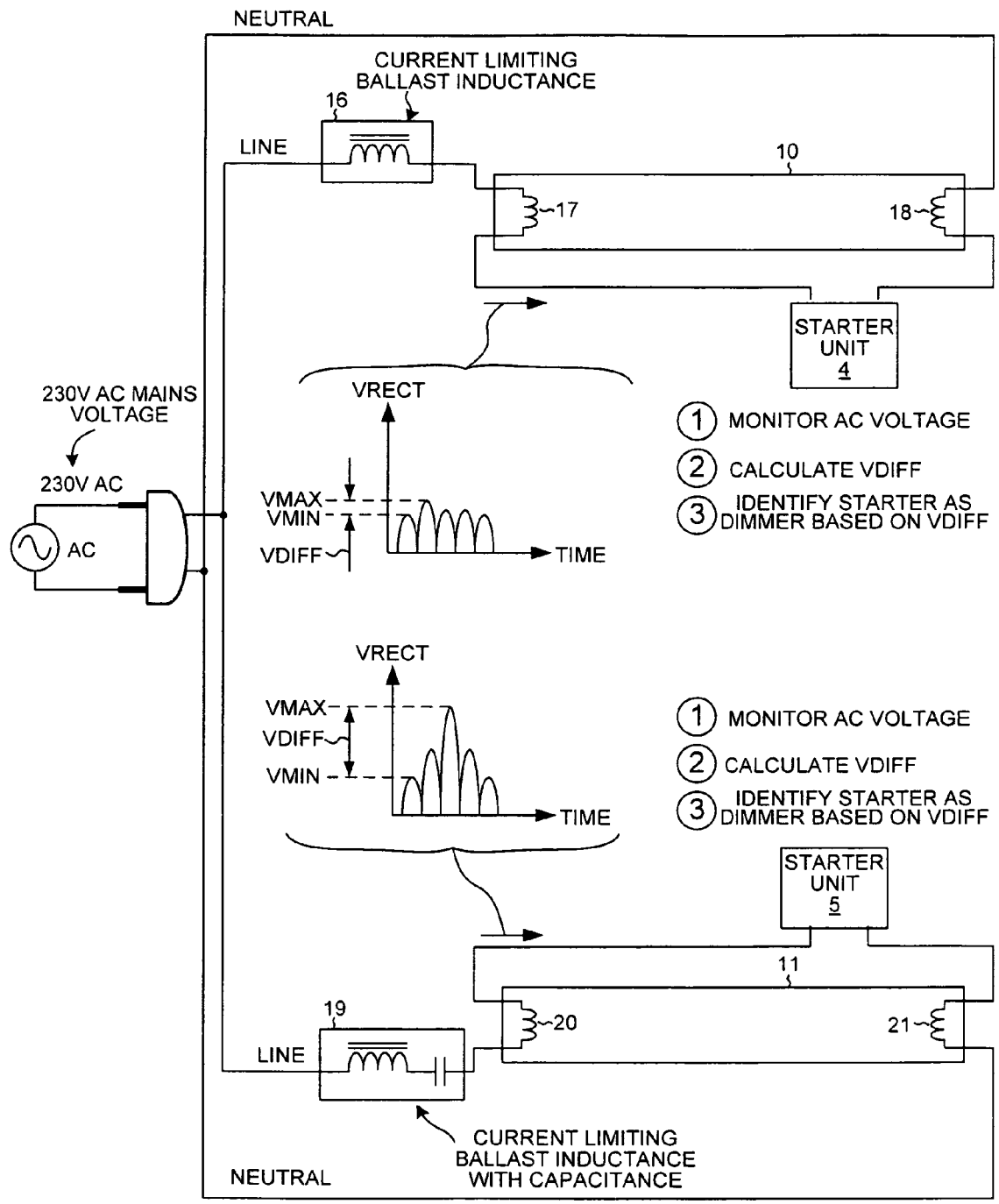
FIG. 5 is illustrative of one example of a method of identifying a wireless fluorescent lamp starter unit as a dimmer starter unit based on the electrical characteristics of the coupled ballast.

FIG. 5 is illustrative of one example by which a starter unit identifies itself as a dimmer starter unit. Multi-lamp light fixtures with multiple ballasts are typically constructed with an equal number of inductive ballasts versus inductive-capacitive ballasts for purposes of power factor correction. Thus, identifying starter units as dimmer starter units based on differing electrical characteristics of their associated ballasts is likely to result in half of the starters identifying themselves as dimmer starters and half not within a given multi-lamp light fixture. In this example, both ballasts 16 and 19 include an inductive component to stabilize current flow through lamps 10 and 11, respectively. However, in addition, ballast 19 also includes a capacitive component. The difference in electrical characteristic between ballasts 16 and 19 causes a difference in peak amplitudes in the full wave rectified voltage sensed by starter unit 4 connected to ballast 16 and starter unit 5 connected to ballast 19, particularly when switch 36 is first closed. This indication is used by a starter unit to identify itself as a dimmer starter unit.

By way of example, current flows through sense resistor 38 when switch 36 of starter unit 4 is first closed. Thus, the full wave rectified voltage VRECT monitored across nodes 32 and 33 is indicative of the AC current flow through switch 36 as discussed with respect to FIG. 4. The peaks of the full wave rectified voltage monitored by starter unit 4 vary over time between a minimum peak voltage signal, VMIN, and a maximum peak voltage signal, VMAX. Starter unit 4 calculates a difference between VMAX and VMIN, characterized as a difference voltage signal, VDIFF. Analogously, starter unit 5 calculates a difference voltage signal, VDIFF associated with the full wave rectified voltage signal, VRECT, monitored by starter unit 5. Ballasts that include a larger capacitive component exhibit higher values of VDIFF than ballasts that are more purely inductive. Thus, the magnitude of VDIFF calculated by starter unit 4 is smaller than the magnitude of VDIFF calculated by starter unit 5. The magnitude of VDIFF is used to distinguish starter units as dimmer starters. In one example, starter unit 4 calculates VDIFF less than 0.2 volts, and thus identifies itself as a dimmer starter. Because starter unit 5 does not calculate VDIFF less than 0.2 volts, it does not identify itself as a dimmer starter. In another example, starter unit 4 calculates VDIFF less than 0.2 volts, and thus does not identify itself as a dimmer starter unit. Whereas starter unit 5 does not calculate VDIFF less than 0.2 volts and does identify itself as a dimmer starter. The value of 0.2 volts is only one example, any other value or combination of values may be used to make the determination of dimmer status.

Figure 6:
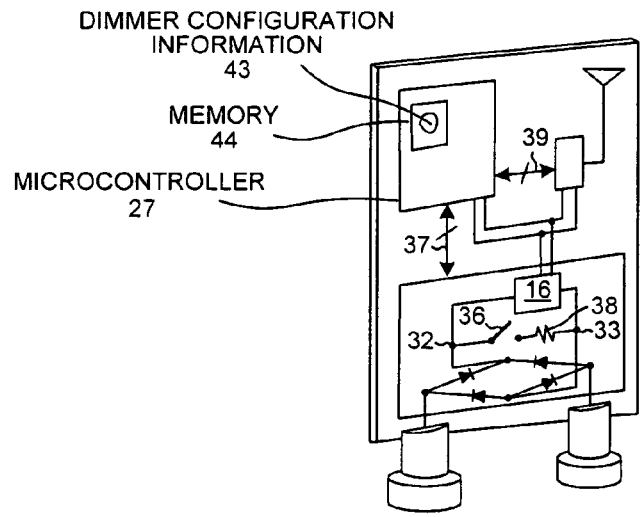
FIG. 6 is illustrative of a software indicator stored in memory as an indicator of dimmer status.

FIG. 6 is illustrative of another example by which a starter unit is identified as a dimmer starter unit based on a software indicator stored in memory. In the present example, microcontroller 27 of starter unit 4 includes an amount of FLASH memory 44. Microcontroller 27 accesses an address in memory 44 where an amount of dimmer configuration information 43 is stored. For example, dimmer configuration information could be a single bit stored in memory 44 and depending on the value of the stored bit, microcontroller 27 identifies starter 4 as a dimmer starter or not. In the present example, dimmer configuration information 43 is written into memory 44 during manufacture or installation of starter unit 4. In other examples, information 43 is remotely programmed via a wireless communication received by starter unit 4.

Figure 7:
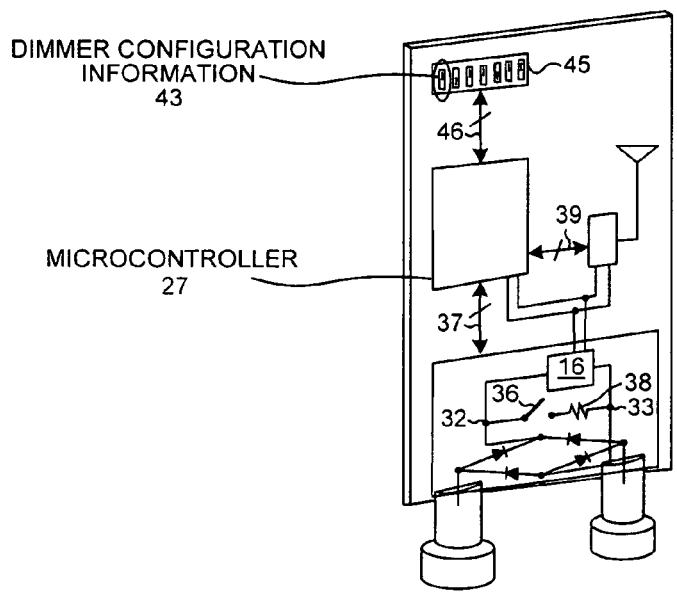
FIG. 7 is illustrative of a hardware pin configuration as an indicator of dimmer status.

FIG. 7 is illustrative of another example by which a starter unit is identified as a dimmer starter unit based on a hardware indication. In the present example, starter unit 4 includes a hardware register 45. The values stored in hardware register 45 are manually selected by configuring a pin or switch associated with each bit. In one example, dimmer configuration information 43 is a single bit configured in hardware register 45. Hardware register 45 is communicatively linked to microcontroller 27 by conductors 46. Based on the pin configuration of hardware register 45, microcontroller 27 accesses dimmer configuration information 43, and depending on the value of the manually configured hardware bit, microcontroller 27 identifies starter 4 as a dimmer starter or not. In another example, dimmer configuration information 43 is stored as multiple bits configured in hardware register 45. In this example a plurality of dimmer starters can be distinguished as dimmer starters of different groups.

Figure 8:
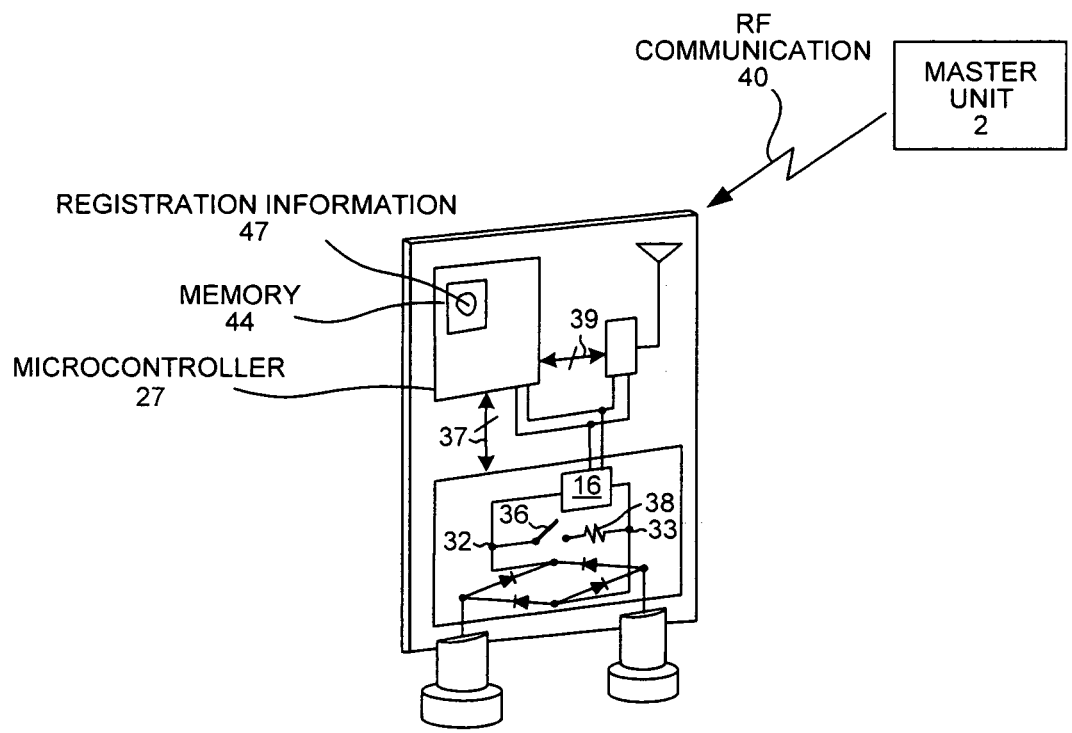
FIG. 8 is illustrative of an RF communication including an indication of dimmer status.

As illustrated in FIG. 8, starter units can be identified as dimmer starter units based on an R/F communication 40 from master unit 2. For example, system 1 is configured such that each RF communication includes a command that includes both a source registration identifier code identifying master unit 2 as well as a destination registration identifier code identifying the starter unit or a group of starter units. The starter units are individually and group controllable. When a starter unit receives an RF communication, and before carrying out the command of the received RF communication, the starter unit uses registration information stored in its FLASH memory to confirm that the RF communication received is intended for that starter unit.

In the present example, starter unit 4 receives a RF communication 40 that includes a source registration identifier code identifying master unit 2 as well as a destination registration identifier code. Starter unit 4 accesses registration information 47 stored in its FLASH memory 44 to confirm that the RF communication received is intended for, starter unit 4. The RF communication includes a command to starter unit 4 indicating that starter unit 4 should identify itself as a dimmer starter unit. Starter unit 4 responds to this command by operating as a dimmer starter unit. In addition, starter unit 4 may write a register in FLASH memory to a particular value to indicate that starter unit 4 is a dimmer starter unit. In this manner, when starter unit 4 is powered down and subsequently powered up, it can identify itself as a dimmer starter unit in the manner described above with reference to FIG. 6. In an analogous manner starter unit 5 of FIG. 2 receives the RF communication 40 that includes a source registration identifier code identifying master unit 2 as well as a destination registration identifier code. Starter unit 5 accesses registration information 47 stored in its FLASH memory 44. However, since the RF communication received is not intended for starter unit 5, registration information 47 of starter unit 5 will not match up with the destination registration identifier code and starter unit 5 will not respond to RF communication 40. Thus, starter unit 5 will not identify itself as a dimmer starter unit and will not operate as a dimmer starter unit. In this manner, some starter units of multi-lamp fixture 3 are configured as dimmer starter units and others are not.

FIGS. 9-14 illustrate how dimmer starter unit 4 can turn off fluorescent lamp 10. In an analogous manner, starter unit 5 can turn off fluorescent lamp 11. In this manner, starter units 4 and 5 can dim multi-lamp fixture 3 as illustrated in FIG. 2.

Figure 9:
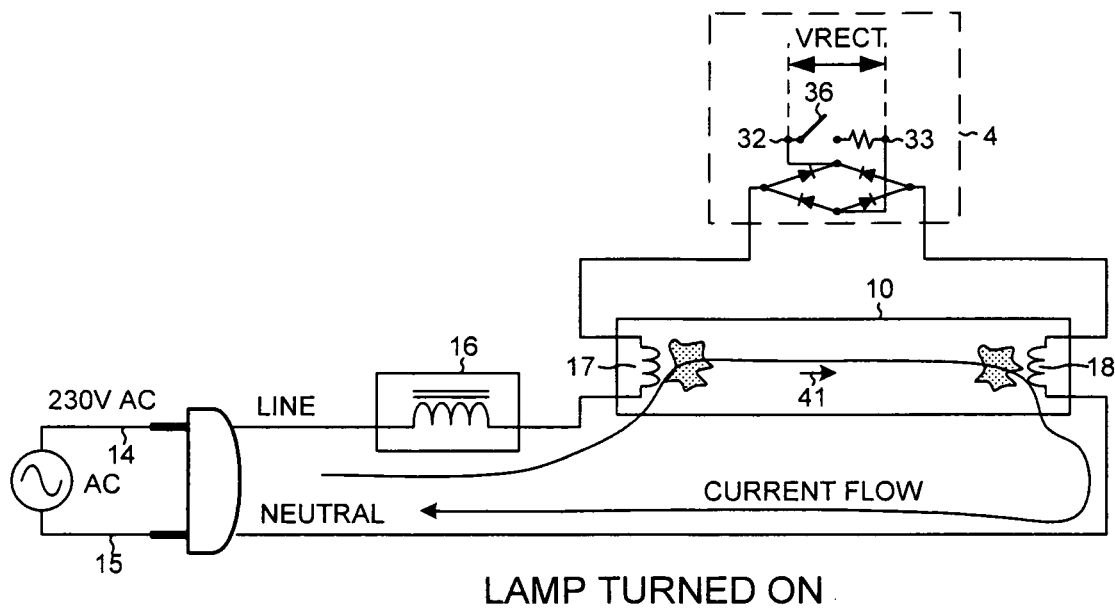
FIGS. 9-14 are circuit diagrams that illustrate how a starter unit can turn off the fluorescent lamp of the light fixture.

Initially, fluorescent lamp 10 is on and the circuit is in the turned on state illustrated in FIG. 9. An AC current flows in current path 41 through LINE conductor 14, through ballast 16, through filament 17, through an arc formed through lamp 10, through filament 18, and to AC NEUTRAL conductor 15. The continuous AC current flow continues to keep the filaments hot such that the arc is maintained, the current flow continues, and the lamp remains in the turned on or ignited state. During this turned on state, switch 36 remains open.

Figure 10:
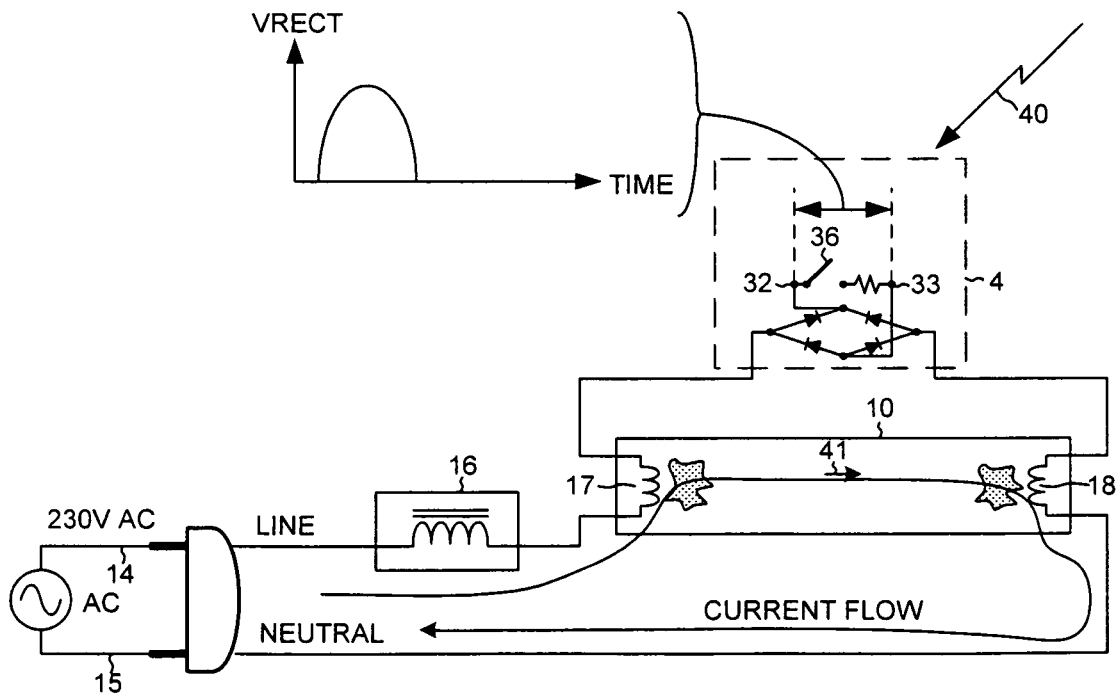
Figure 11:
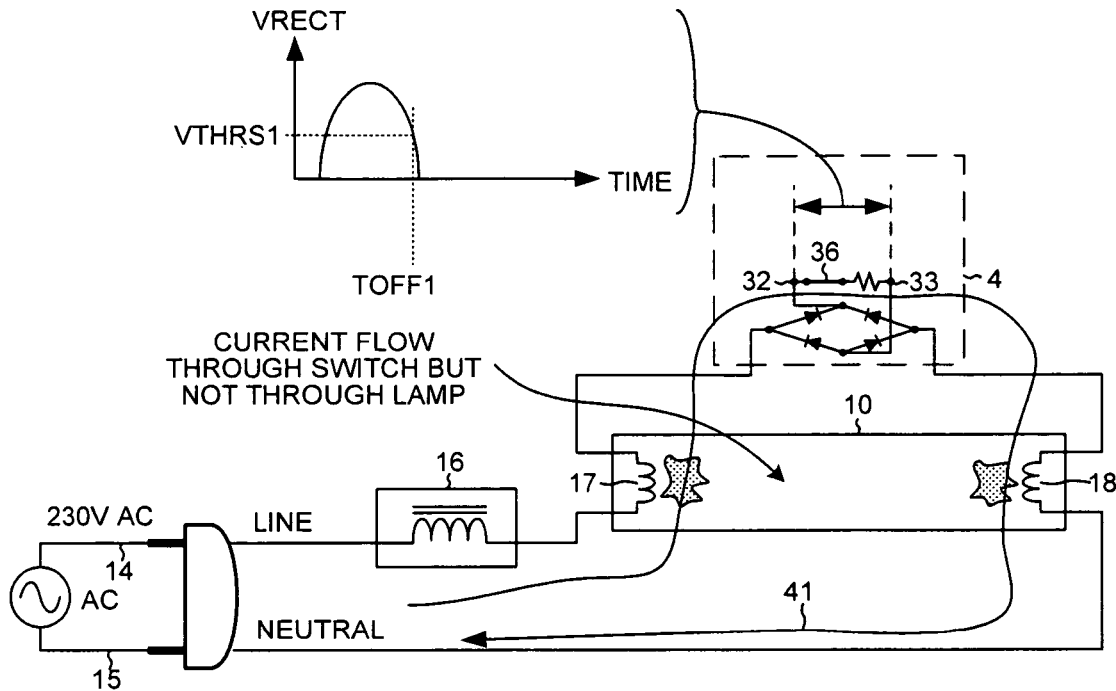
Figure 12:
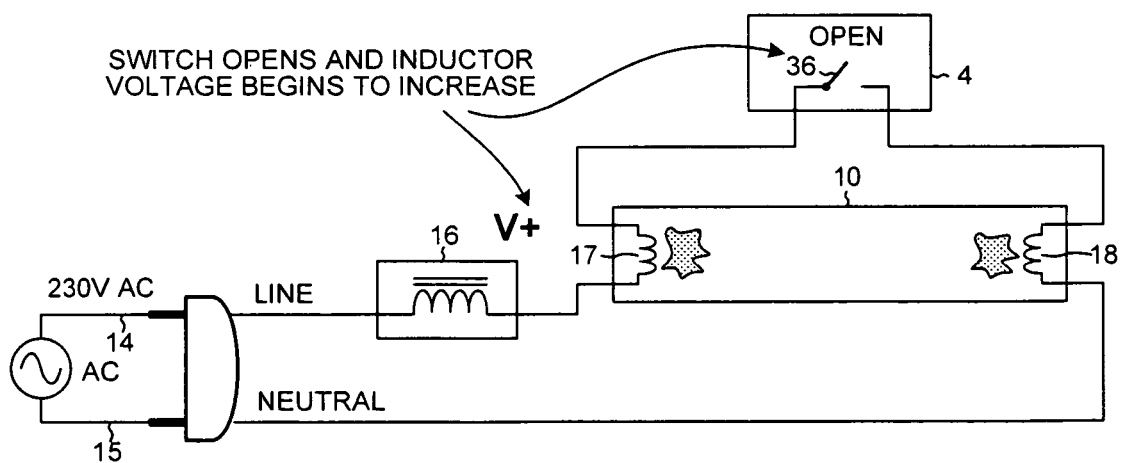
Figure 13:
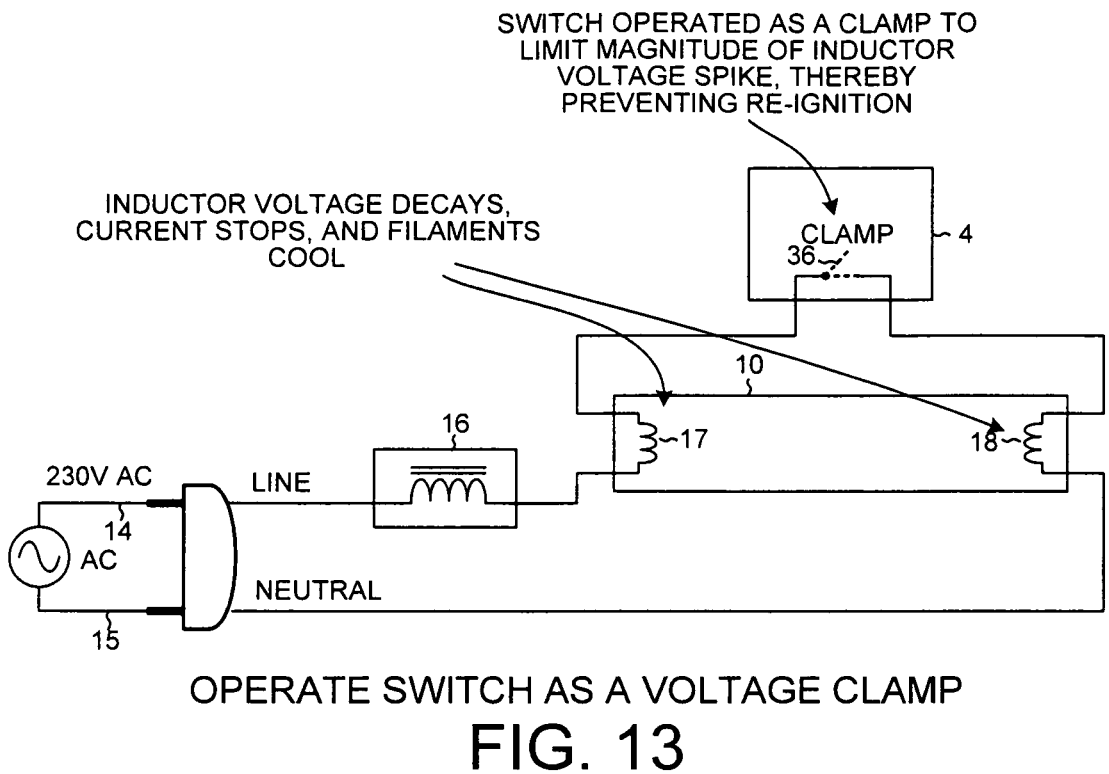
Figure 14:
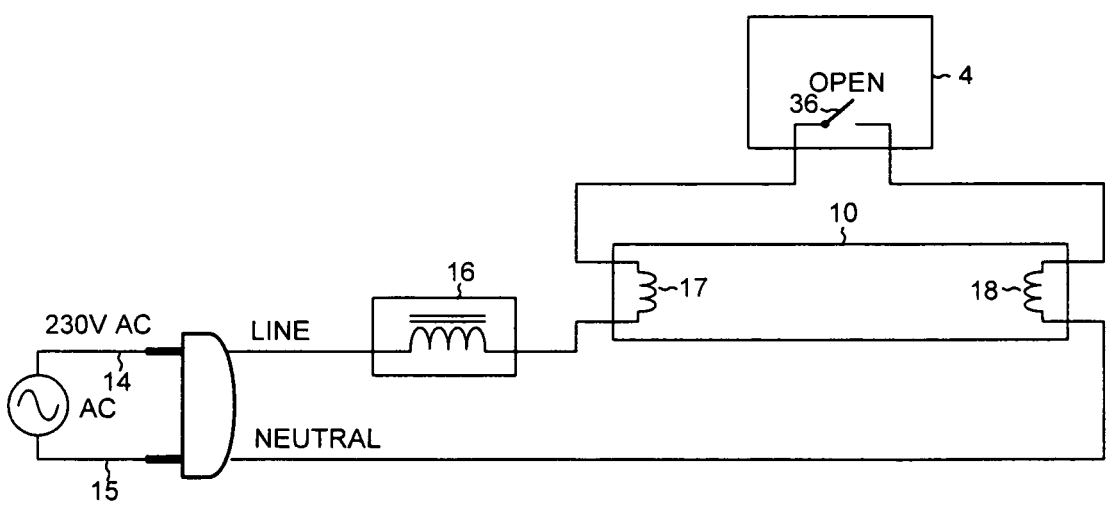
Figure 15:
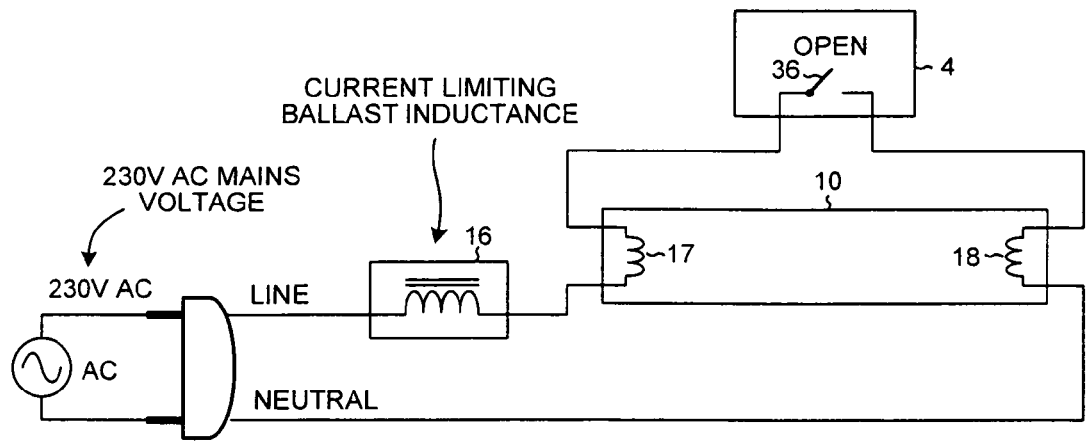
FIG. 15-18 are circuit diagrams that illustrate how a starter unit can turn on a fluorescent lamp of the light fixture.

As illustrated in FIG. 10, starter 4 receives a wireless communication 40 that includes a DIM command. In one example, wireless communication 40 is transmitted by master unit 2 (see FIG. 1). In response to receiving wireless communication 40, starter unit 4 begins to monitor the full wave rectified voltage signal, VRECT, present between nodes 32 and 33. Microcontroller 27 monitors and traces the AC voltage waveform between nodes 32 and 33 using an Analog-to-Digital Converter (ADC) that is part of the microcontroller. As illustrated in FIG. 11, starter unit 4 initiates turn off of fluorescent lamp 10 when VRECT reaches a pre-programmed voltage threshold, VTHRS1. In the illustrated example, VRECT reaches VTHRS1 at a time TOFF1. Microcontroller 27 detects that the monitored signal, VRECT, has reached VTHRS1 and in response, controls switch 36 to close. In another example, dimmer starter unit 4 immediately controls switch 36 to close in response to receiving the DIM command. When switch 36 closes, the current flow stops flowing through lamp 10 but rather flows through closed switch 36. The electric arc within lamp 10 is stopped and fluorescent lamp 10 is turned off or extinguished. Current, however, continues to flow through filaments 17 and 18 and the filaments continue to be heated. Switch 36 can only remain closed in this condition for a short amount of time or the switch will become overheated and will be destroyed. Next, switch 36 is opened as illustrated in FIG. 12. The cutting of current flow through ballast 16 causes a voltage to start to develop across ballast 16, but before the voltage can increase to the point that an arc is ignited through lamp 10, switch 36 is made to operate as a voltage clamp to limit the magnitude of the voltage spike. Clamp operation of switch 36 is illustrated in FIG. 13 by showing switch 36 in dashed lines. Due to the clamping action of switch 36, the voltage across ballast 16 is not high enough to ignite an arc through lamp 10, and energy stored in a magnetic field in ballast 16 is dissipated. After enough of the energy stored in ballast 16 has been dissipated and after filaments 17 and 18 have stopped ionizing gas to an adequate degree, then switch 36 is opened on a constant basis without igniting an arc. This condition is illustrated in FIG. 14. There is no current flow, and the filaments 17 and 18 begin to cool.

FIGS. 15-18 illustrate how dimmer starter unit 4 can turn on fluorescent lamp 10. In an analogous manner, starter unit 5 can turn on fluorescent lamp 11. In an initial condition illustrated in FIG. 15, switch 36 of dimmer starter unit 4 is open, and no current is flowing through filaments 17 and 18.

Figure 16:
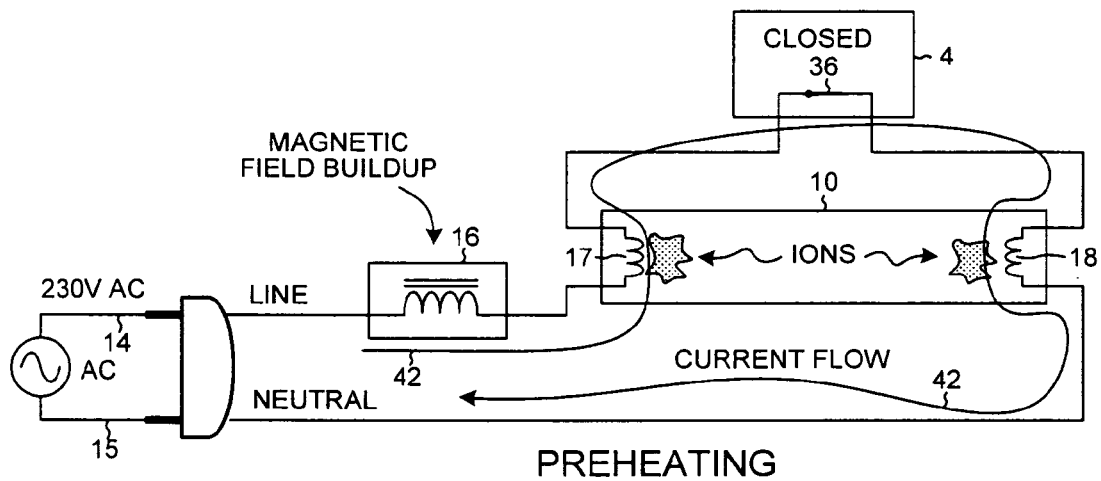
Figure 17:
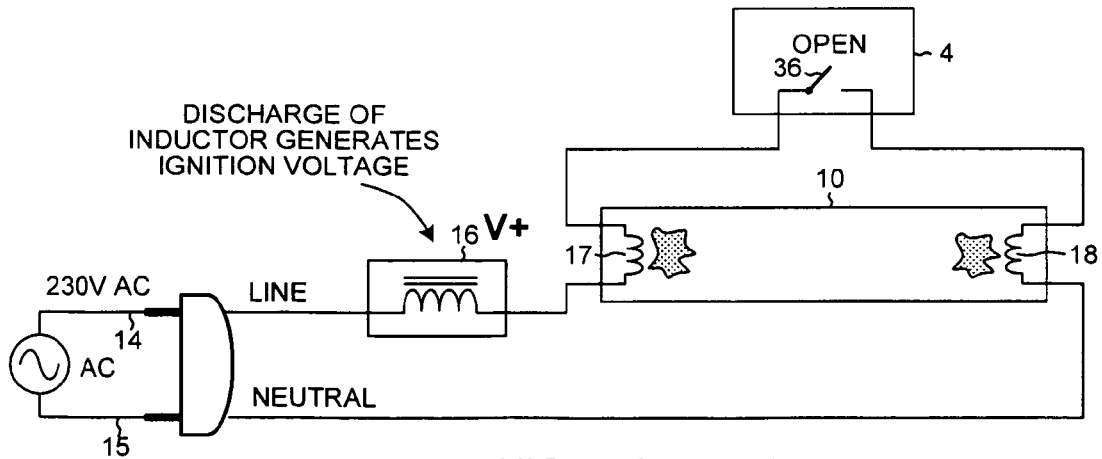
Figure 18:
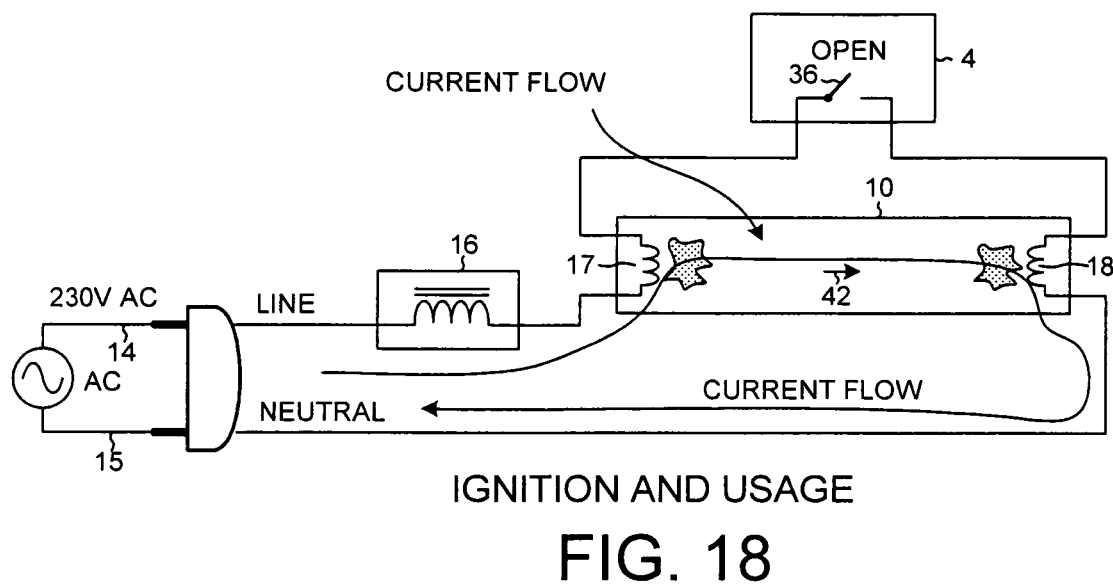

The filaments 17 and 18 are relatively cold. Microcontroller 27 then controls switch 36 to close as shown in FIG. 16. An AC current then flows in current path 41 through LINE conductor 14, through ballast 16, through filament 17, through closed switch 36, through filament 18, and to AC NEUTRAL conductor 15. This AC current flow 41 causes filaments 17 and 18 to heat, and causes gas in lamp 10 to ionize. This current flow through switch 36 can only be sustained for a relatively short amount of time or switch 36 will overheat and be destroyed. Accordingly, after about one second, switch 36 is opened as illustrated in FIG. 17. The current flow through ballast 16 is interrupted, and this causes a large voltage (for example, one thousand volts or more) to develop across ballast 16. Due to switch 36 being open, a large voltage V+ is present between the two filaments 17 and 18. As illustrated in FIG. 18, large voltage V+ ignites the lamp by causing an arc 42 to form through lamp 10. Due to arc 42, the resistance between the filaments through the lamp decreases. The continued AC current flow continues to keep the filaments hot such that the arc is maintained and current flow continues. The fluorescent lamp is then on and switch 36 remains open.

Figure 19:
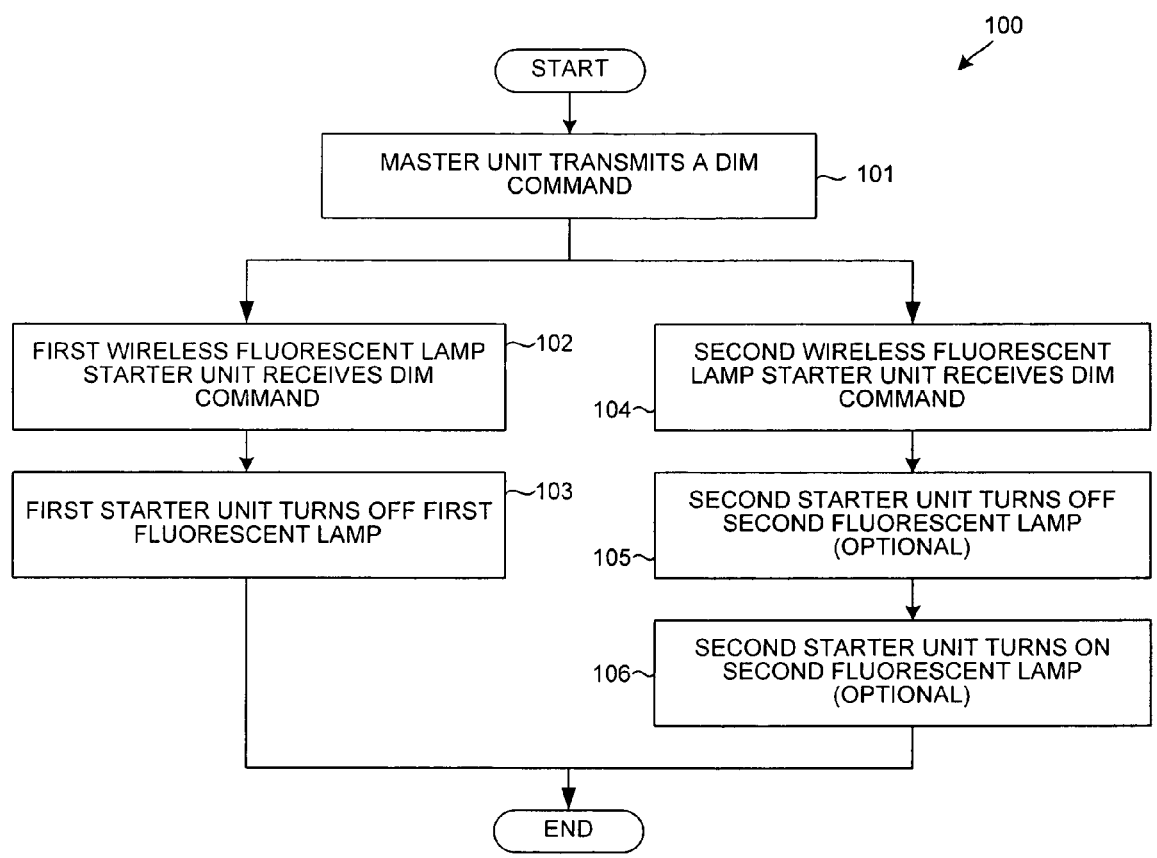
FIG. 19 is a flowchart that illustrates a first method of dimming a multi-lamp fluorescent lamp fixture. A dimmer starter unit receives a DIM command and turns off a coupled lamp while other lamps remain illuminated. Optionally, all lamps are turned off and lamps not coupled to a dimmer starter are quickly restarted.

FIG. 19 illustrates one example of a method 100 of dimming a multi-lamp fluorescent fixture. In the present example, master unit 2 transmits a communication that includes a dim command (step 101). Both, starter unit 4 and starter unit 5 receive this communication (steps 102 and 104, respectively). In one example, the communication is an RF communication from master unit 2 that is received by starter units 4 and 5. In another example, the communication is transmitted from master unit 2 to starter units 4 and 5 by way of wired conductors. In response to receiving the communication, starter unit 4, initiates turn-off of fluorescent lamp 10 (step 103) while fluorescent lamp 11 of multi-lamp fixture 3 remains illuminated. In another example, in response to receiving the communication, starter unit 5 initiates turn-off of fluorescent lamp 11 (step 105), such that both lamp 10 and 11 are turned off at substantially the same time. In the present example, the time elapsed between the turn off of lamp 10 and lamp 11 is less than one millisecond. After turn off of lamp 11, starter unit 5 initiates turn on of lamp 11 (step 106). In the present example, starter unit 5 initiates turn on of lamp 11 within three seconds of turning off lamp 11. In this manner, multi-lamp fixture 3 is dimmed by turning off a subset of fluorescent lamps within the fixture.

Although certain specific embodiments are described above for instructional purposes, the teachings of this patent document have general applicability and are not limited to the specific embodiments described above. The particular ways of dimming a multi-lamp fluorescent light fixture by turning off a subset of fluorescent lamps using wireless fluorescent lamp starter units as set forth in the description above are just illustrative examples. Other ways of identifying a starter unit as a dimmer starter unit in the field are possible. For example, the master unit may communicate on an ad hoc basis to identify individual starter units as dimmer starter units. In some embodiments, the master unit may not detect occupancy, but rather detect ambient light. For example, the master unit may detect ambient light levels and selectively turn off fluorescent lamps to implement daylight harvesting in building environments where ambient light may be available to at least partially illuminate the space. In systems in which individual starter units are individually controllable, a master unit may dim some multi-lamp fluorescent light fixtures separately from others. The RF transceivers of the starter units may form a wireless network usable to communicate other types of information. Master units need not be installed on ceilings and need not take the form illustrated in FIG. 1, but rather may take other forms and may be incorporated into other objects such as wall switches. The dimming of multi-lamp fluorescent light fixtures using wirelessly-controllable starter units is not limited to any particular type of fluorescent lamp technology and is not limited to preheat lamps having thermionic filaments and inductive ballasts. Although an example of the multi-lamp fixture 3 is described above involving a 230 volts AC power system, the master/starter unit system can work with other AC power sources such as 120 volts as well as with DC power sources. Accordingly, various modifications, adaptations, and combinations of various features of the described embodiments, can be practiced without departing from the scope of the invention as set forth in the claims.

What is claimed is:

1. A method of dimming a multi-lamp fluorescent light fixture comprising:
   (a) turning off a first fluorescent lamp using a first wireless fluorescent lamp starter unit, wherein the first fluorescent lamp is taken from a plurality of illuminated fluorescent lamps of the multi-lamp fluorescent light fixture.

2. The method of claim 1, further comprising:
   (b) turning off a second fluorescent lamp of the plurality of illuminated fluorescent lamps using a second wireless fluorescent lamp starter unit at substantially the same time as the turning off of (a); and
   (c) turning on the second fluorescent lamp using the second wireless starter unit after the turning off of (b) while the first fluorescent lamp remains turned off.

3. The method of claim 1, wherein an Alternating Current (AC) line voltage supply supplies electrical power to the first fluorescent lamp and the second fluorescent lamp, and wherein the dimming of the multi-lamp fluorescent light fixture is performed without disconnecting the AC line voltage supply from the first fluorescent lamp or from the second fluorescent lamp.

4. The method of claim 1,
   wherein the turning off of (a) is performed in response to receiving a wireless communication from a master unit.

5. The method of claim 2, wherein the time between the turning off of the first lamp and the turning off of the second lamp is less than one millisecond.

6. The method of claim 2, wherein the time between the turning off of the second lamp and the subsequent turning on of the second lamp is less than three seconds.

7. The method of claim 1, further comprising:
   (b) identifying the first starter unit as a dimmer starter.

8. The method of claim 7, wherein the identifying of (b) involves:
   (b1) monitoring an AC voltage indicative of an AC current flowing through the first starter unit;
   (b2) identifying an electrical characteristic of the AC voltage based on the monitoring of (b1); and
   (b3) identifying the first starter unit as a dimmer starter based on the identifying of (b2).

9. The method of claim 8, wherein the monitoring of (b1) and the identifying of (b2) and (b3) are performed by the first starter unit.

10. The method of claim 7, wherein the identifying of (b) involves:
    (b1) accessing dimmer configuration information stored in an amount of on-board memory, wherein said dimmer configuration information identifies the first starter unit as a dimmer starter.

11. The method of claim 7, wherein the identifying of (b) involves:
    (b1) accessing dimmer configuration information stored in a hardware register, wherein said dimmer configuration information identifies the first starter unit as a dimmer starter.

12. The method of claim 7, wherein the identifying of (b) involves:
    (b1) receiving a Radio Frequency (RF) communication from a master unit that identifies the first starter unit as a dimmer starter.

13. An apparatus comprising:
    a first wireless fluorescent lamp starter unit adapted to receive a wireless communication;
    a first fluorescent lamp coupled to the first starter unit;
    a second wireless fluorescent lamp starter unit adapted to receive the wireless communication; and
    a second fluorescent lamp coupled to the second starter unit, wherein the second starter unit responds to the wireless communication by turning off the second lamp and subsequently turning on the second lamp, and wherein the first starter unit responds to the wireless communication by turning off the first lamp and not subsequently turning on the first lamp.

14. The apparatus of claim 13, wherein the wireless communication is a dim command received from a master unit.

15. The apparatus of claim 13, wherein the time between turning off the second lamp and subsequently turning on the second lamp is less than three seconds.

16. The apparatus of claim 13, wherein the time between turning off the first lamp and turning off the second lamp is less than one millisecond.

17. The apparatus of claim 13, further comprising:
    a ballast coupled to the first starter unit, wherein the first starter unit identifies itself as a dimmer starter by monitoring an indication of an Alternating Current (AC) current supplied to the starter unit from the ballast.

18. The apparatus of claim 13, wherein the first starter unit identifies itself as a dimmer starter by receiving a second wireless communication from a master unit.

19. An apparatus comprising:
    a first fluorescent lamp coupled to a first ballast, wherein the first ballast is adapted to receive an Alternating Current (AC) line voltage from an AC line voltage supply;
    a second fluorescent lamp coupled to a second ballast, wherein the second ballast is adapted to receive the AC line voltage from an AC line voltage supply; and
    means for turning off the first lamp and the second lamp at substantially the same time without disconnecting the AC line voltage supply, and subsequently turning on the second lamp without turning on the first lamp.

20. The apparatus of claim 19, wherein the means turns off the second lamp and subsequently turns on the second lamp within one millisecond.

* * * * *